US010743173B2

(12) United States Patent
Akhavain Mohammadi

(10) Patent No.: US 10,743,173 B2
(45) Date of Patent: Aug. 11, 2020

(54) VIRTUAL ANCHORING IN ANCHORLESS MOBILE NETWORKS

(71) Applicant: Mehdi Arashmid Akhavain Mohammadi, Ottawa (CA)

(72) Inventor: Mehdi Arashmid Akhavain Mohammadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/666,224

(22) Filed: Aug. 1, 2017

(65) Prior Publication Data
US 2019/0045355 A1 Feb. 7, 2019

(51) Int. Cl.
| | | |
|---|---|---|
| H04W 4/00 | (2018.01) | |
| H04W 8/24 | (2009.01) | |
| H04W 40/36 | (2009.01) | |
| H04W 36/12 | (2009.01) | |
| H04W 48/16 | (2009.01) | |
| H04W 24/08 | (2009.01) | |
| H04W 36/08 | (2009.01) | |
| H04W 88/16 | (2009.01) | |

(52) U.S. Cl.
CPC .............. *H04W 8/24* (2013.01); *H04W 36/12* (2013.01); *H04W 40/36* (2013.01); *H04W 48/16* (2013.01); *H04W 24/08* (2013.01); *H04W 36/08* (2013.01); *H04W 88/16* (2013.01)

(58) Field of Classification Search
None
See application file for complete search history.

(56) References Cited

U.S. PATENT DOCUMENTS

| 10,091,645 | B1 | 10/2018 | Akhavain Mohammadi |
| 2012/0002608 | A1 | 1/2012 | Vesterinen et al. |
| 2013/0138758 | A1* | 5/2013 | Cohen ............... H04L 29/08549 709/212 |

(Continued)

FOREIGN PATENT DOCUMENTS

| CN | 106792773 A | 5/2017 |
| WO | 2016086807 A1 | 6/2016 |
| WO | 2017089886 A1 | 6/2017 |

OTHER PUBLICATIONS

R2-131991 Intel Corporation, "Virtual anchor cell to reduce signalling load", 3GPP TSG RAN WG2 Meeting #82, Fukuoka, Japan, May 25, 2013.

(Continued)

*Primary Examiner* — Suhail Khan

(57) ABSTRACT

A method in a node of a Mobile network. The method comprises: instantiating Virtual Anchor Unit configured to: maintain device administration data pertaining to a respective mobile electronic device, the device administration data including at least one statistic pertaining to traffic to and from the mobile electronic device, and at least one rule for controlling an operation of the mobile electronic device; update the at least one statistic based on the traffic to and from the mobile electronic device; and enforce the at least one rule based on the at least one statistic. The VAU is associated with a monitoring point of traffic to and from the respective mobile electronic device. Operation of the VAU is facilitated using the monitoring point.

15 Claims, 14 Drawing Sheets

(56) References Cited

U.S. PATENT DOCUMENTS

2015/0124622 A1* 5/2015 Kovvali ............ H04W 28/0215
 370/236
2016/0165454 A1* 6/2016 Li ........................ H04W 88/16
 370/254
2017/0188223 A1 6/2017 Gundavelli et al.

OTHER PUBLICATIONS

Von Hugo et al. Rews M Liebsch Nec R Schott Deutsche Telekom S Seo Korea: "Access Technology Independent Connectivity and Mobility Control Problem Statement; draft-hsblss-atticps-00.txt", Jun. 2017, pp. 1-10, XP015120609.

* cited by examiner

VIRTUAL ANCHORING IN ANCHORLESS MOBILE NETWORKS

FIELD OF THE INVENTION

The present invention pertains to the field of Communication networks, and in particular to Virtual Anchoring in anchorless Mobile Networks.

BACKGROUND

Mobile Back-Haul networks typically depend on an anchor node, such as either one or both of a Serving Gateway (SGW) and a Packet Data Network (PDN) Gateway (PGW) to provide device administration services (such as traffic monitoring, policy enforcement, and generating reports for customer billing) pertaining to mobile electronic devices.

So-called anchorless networks have been proposed, but these proposals do not provide any means by which the device administration services may be maintained.

This background information is provided to reveal information believed by the applicant to be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Accordingly, an aspect of the present invention provides a method in a node of a Mobile network. The method comprises: instantiating a Virtual Anchor Unit (VAU) configured to: maintain device administration data pertaining to a respective mobile electronic device, the device administration data including at least one statistic pertaining to traffic to and from the mobile electronic device, and at least one rule for controlling an operation of the mobile electronic device; update the at least one statistic based on the traffic to and from the mobile electronic device; and enforce the at least one rule based on the at least one statistic. The VAU is associated with a monitoring point of traffic to and from the respective mobile electronic device. Operation of the VAU is facilitated using the monitoring point.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

In the following description, features of the present invention are described by way of example embodiments. For convenience of description, these embodiments make use of features and terminology known from 4G and 5G networks as defined by the Third Generation Partnership Project (3GPP). However, it shall be understood that the present invention is not limited to such networks. Rather, methods and systems in accordance with the present invention may be implemented in any network in which a mobile device may connect to the network through at least one access point, and subsequently be handed-over to at least one other access point during the course of a communications session.

Figure 1:
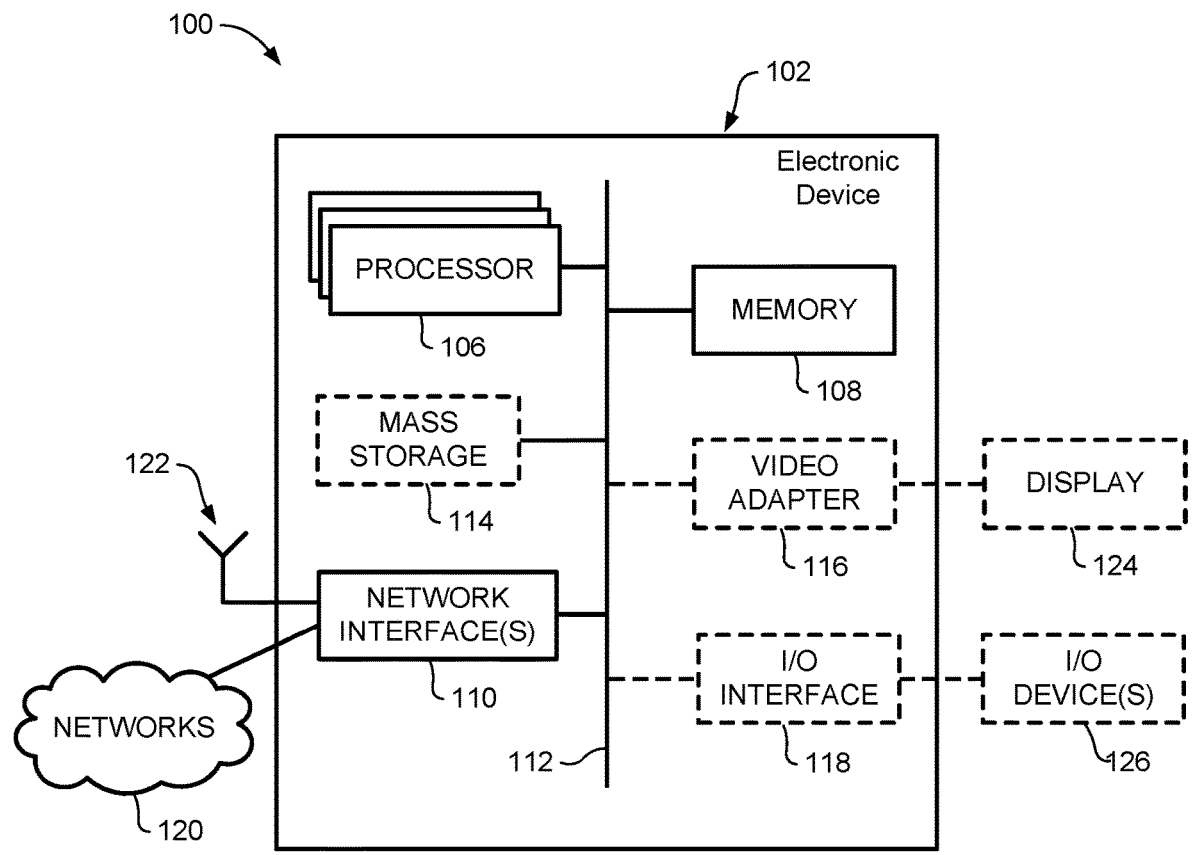
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device 2 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
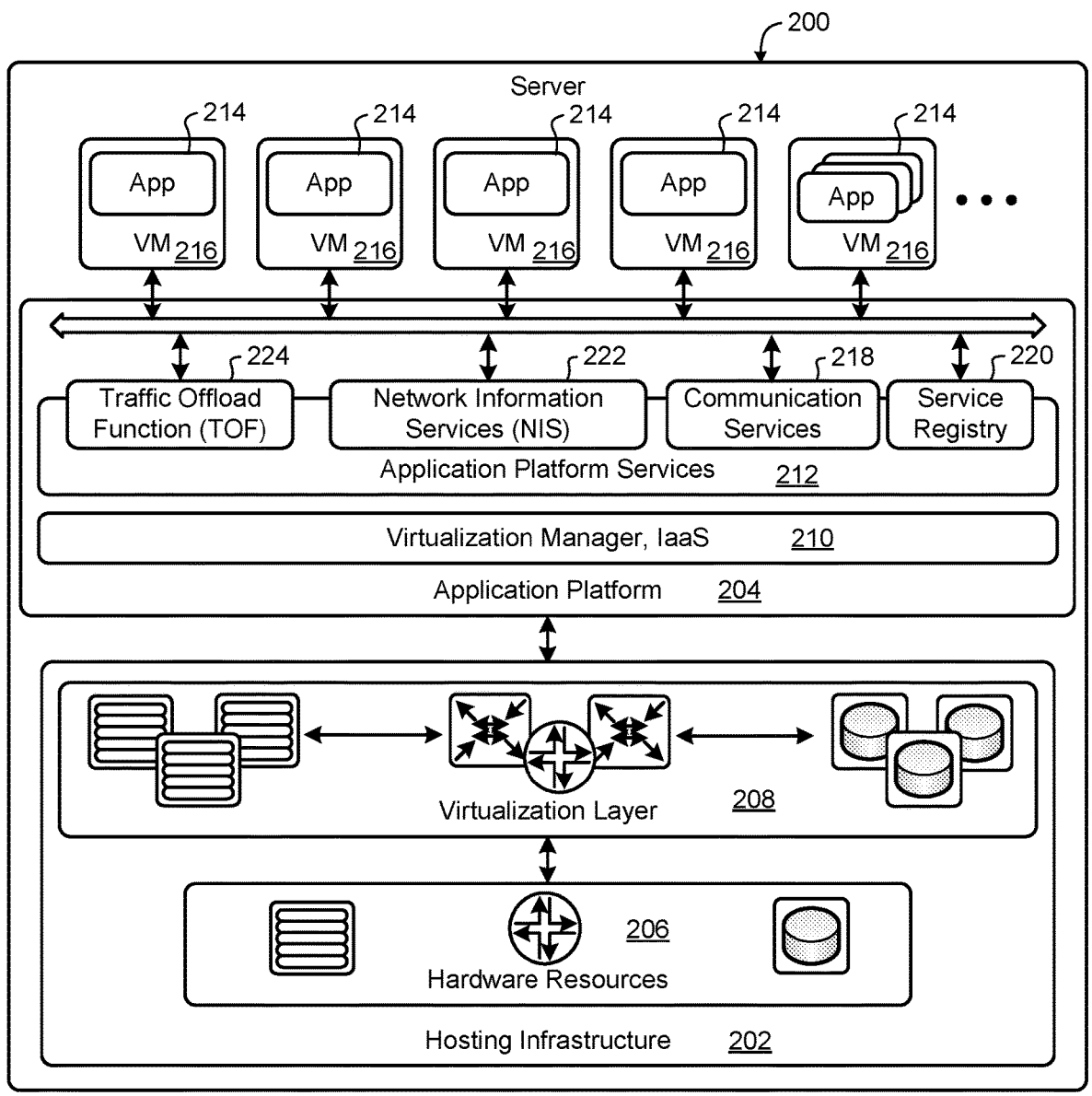
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middle-ware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3:
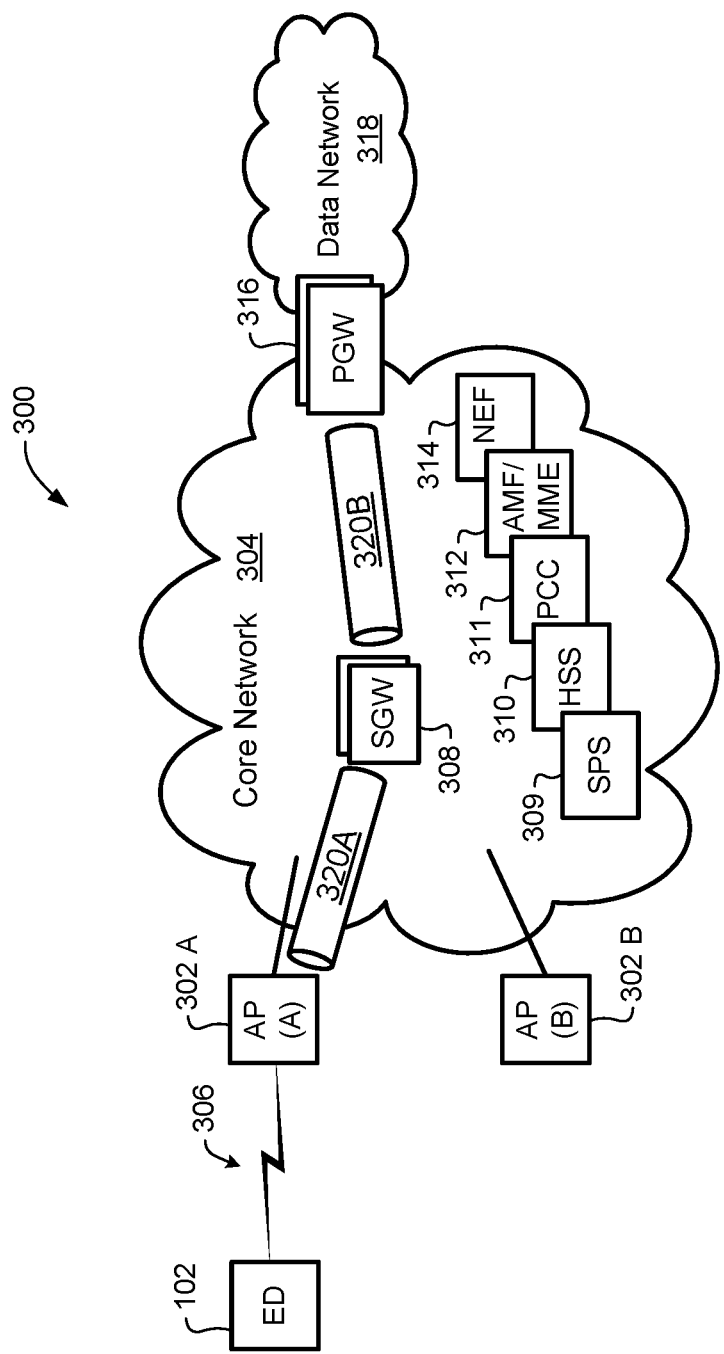
FIG. 3 is a block diagram illustrating elements of a mobile network in which embodiments of the present invention may be deployed.

FIG. 3 is a block diagram schematically illustrating an architecture of a representative network 300 usable in embodiments of the present invention. In some embodiments, the network 300 may be physically implemented as one or more computers, storage devices and routers (any or all of which may be constructed in accordance with the system 100 described above with reference to FIG. 1) interconnected together to form a Wide Area Network, and executing suitable software to perform its intended functions. In other embodiments, some or all of the elements of the network 300 may be virtualized entities executing in a server environment such as described above with reference to FIG. 2. For this reason, a figure showing the physical network hardware is not included in this specification. Rather, the block diagram of FIG. 3 shows a representative functional architecture of a network 300, it being understood that this functional architecture may be implemented using any suitable combination of hardware and software.

In the example of FIG. 3, the network 300 comprises a pair of access points 302A, 302B connected to a core network 304 which is configured to provide communications and connectivity services to electronic devices 102 connected to the access points 302A, 302B via links 306. In some embodiments, the links 306 may include wireless links between the ED 102 and an antenna 122 (not shown in FIG. 3) connected to network interfaces 110 of the AP 302. In embodiments deployed in a Centralized Radio Access network (CRAN) environment, the links 306 may encompass both wireless links and fronthaul connections to the access point 302. In the 4G or 5G networking environments, the access points 302A, 302B may be provided as eNodeB or gNB nodes, and the core network 304 may be an Evolved Packet Core (EPC) network providing network functions such as a Serving Gateway (SGW) 308, Service Provider Server (SPS) 309, a Home Subscriber Server (HSS) 310, a Policy and Charging Control (PCC) function 311, an Access and Mobility Management Function (AMF) 312 or its predecessor Mobility Management Entity (MME), a Network Exposure Function (NEF) 314 and a PDN Gateway (PGW) 316. In some embodiments, the PDN Gateway 316 may be configured to provide connectivity to a data network 318 (such as the Internet, for example). It will be appreciated that in typical 4G or 5G networking environment, there may be more than one each of the SGW 308, SPS 309, HSS 310, PCC 311, AMF/MME 312, NEF 314 and PGW 316. In some embodiments, User-Plane packets to and from the ED 102 may be transported through GPRS Tunnel Protocol (GTP) tunnels 320A and 320B extending between an Access point 302 serving the ED 102 and the SGW 308, and between the SGW 308 and the PGW 316.

Figure 4:
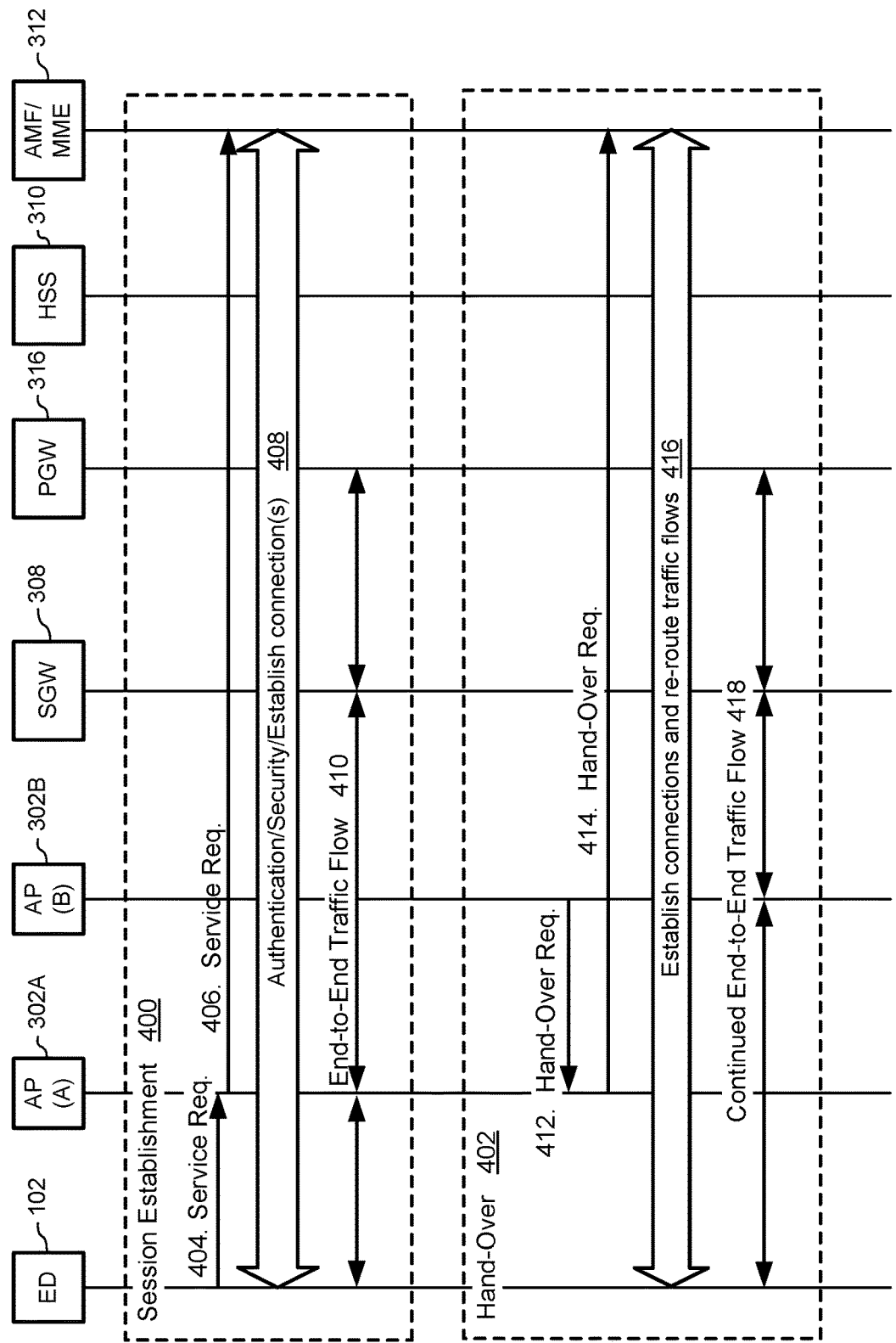
FIG. 4 is a message flow diagram illustrating example session establishment and Hand-Over processes.

FIG. 4 is a message flow diagram illustrating example session establishment 400 and Hand-Over 402 procedures of the type that may be implemented in the network 300 of FIG. 3.

As may be seen in FIG. 4, session establishment 400 typically begins with a service request 404 that is sent from the mobile electronic device (ED) 102 to an initial Access Point 302A. Upon receipt of the service request 404, the Access Point 302A may forward a corresponding service request (at 406) to the AMF/MME 312. Following receipt of the service request, the AMF/MME 312 may interact (at 408) with the HSS 310 to authenticate the service request and, upon successful authentication, with the SGW 308 and PGW 316 to establish connections (such as, for example GPRS Tunneling Protocol (GTP) tunnels) and associations needed to support the requested service. In some embodiments, the SGW 308 may interact with the HSS 310, PCC 311 and AMF/MME 312 to obtain service requirements, policies and security codes (such as encryption keys). In addition, the SGW 308 and PGW 316 may install Device Administration (DA) rules including ED-specific policy information, policy enforcement (policing) rules, traffic monitoring rules and statistic acquisition and reporting rules to enable the SGW 308 and PGW 316 to monitor traffic flows to and from the ED 102, enforce policies, report problems and facilitate customer billing etc.

Once connections and associations needed to support the requested service have been established, end-to-end traffic flows associated with the service session can begin (at 410). During the course of the service session, the SGW 308 and PGW 316 may operate in accordance with the installed DA rules to monitor the traffic flows to acquire relevant statistics, enforce policies, and generate reports to enable billing of the customer. For example, in a 4G and 5G environment, the SGW 308 and PGW 316 may monitor traffic flows through the GTP tunnels 320 established to carry User-Plane packets to and from the ED 102.

As is known in the art, during the course of the communications session, the ED 102 may move from a coverage area of the initial Access Point 302A and enter a coverage area of a new Access Point, such as access point 302B. At this time, the new access point 302B may initiate the Hand-Over procedure 402 by sending a Hand-Over request 412 to the initial Access Point 302A, which may respond to the Hand-Over request 412 by sending a corresponding Hand-Over request 414 to the AMF/MME 312. Following receipt of the Hand-Over request 414, the AMF/MME 312 may interact with the ED 102, the involved access points 302A and 302B and the SGW 308 to trigger establishment (at 416) of new connections with the new access point 302B, and re-route end-to-end traffic flows associated with the ED 102. Upon completion of this operation the end-to-end traffic flows to and from the ED 102 can continue (at 418), but in this case are being routed through the new access point 302B. The SGW 308 and PGW 316 may continue to monitor the traffic flows associated with the ED 102 to acquire relevant statistics, enforce policies, and generate reports to enable billing of the customer.

During and after the Hand-Over procedure 402, all of the end-to-end traffic associated with one or more service sessions of the ED 102 is routed through the SGW 308 and PGW 316, which maintain the Device Administration (DA) rules. Since the SGW 308 and PGW 318 do not change as the ED 102 moves from AP to AP during the course of any particular service session, they are often referred to as "anchor nodes". The SGW 308 typically handles routing changes as the ED 102 moves from one AP 302A to another AP 302B, and so may be referred to as a "mobility anchor". In conventional network systems, all of the end-to-end traffic associated with a particular service session is routed through the mobility anchor node established at the beginning of the service session, even if a new AP 302B is associated with a different SGW or PGW that may be better positioned to handle the traffic than the initial anchor node established at the beginning of the service session.

So-called anchorless techniques that that enable communications connections to be established and rerouted during a communications session are known. An important characteristic of these techniques is that they do not rely on GTP tunnels 320 or anchor nodes, such as an SGW 308 or a PGW 316, to coordinate the establishment of connections and routing of session traffic. However, these techniques do not offer any mechanism by which the Device Administration functions can be performed without the anchor node. The present invention addresses this deficiency by providing a Virtual Anchor Unit (VAU) configured to perform the Device Administration functions normally performed by an anchor node.

Figure 5:
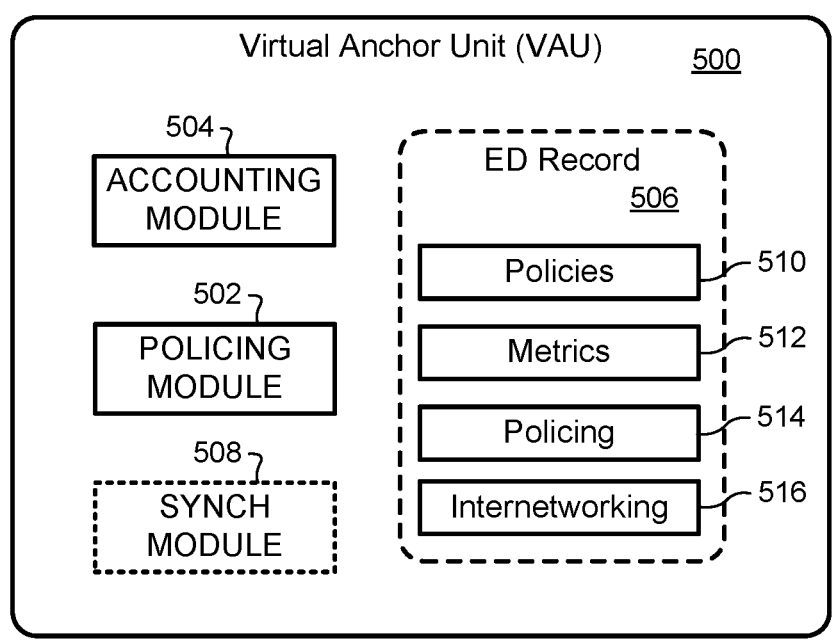
FIG. 5 is a block diagram illustrating elements of a Virtual Anchor Unit (VAU) in accordance with representative embodiments of the present invention.

FIG. 5 is a block diagram illustrating principle elements of an example Virtual Anchor Unit (VAU) 500 in accordance with embodiments of the present invention. The VAU 500 is preferably provided as a virtualized entity instantiated on a suitable host, and providing traffic monitoring, reporting and policy enforcement functions normally provided by an anchor node. It will be appreciated that a virtual anchor unit (VAU) 500 may be implemented using any desired virtualization technology. For example, a VAU 500 could be implemented as a virtual machine 216 accessing virtualized resources of its host as described above with reference to FIG. 2. However, the use of Operating-System-Level virtualization, in which VAUs 500 are instantiated as respective isolated user space instances has an advantage in that a user space instance consumes fewer resources than an equivalent virtual machine, and the operating system of the host has more control over the execution of applications within the user space instance. Both of these factors mean that a host system using Operating-System-Level virtualization can host significantly more user space instances (and thus VAUs 500) than virtual machines 216.

In general terms, each virtual anchor unit (VAU) 500 is associated with a specific ED 102, and is configured to implement performance monitoring and policy enforcement functions for that specific ED. In some embodiments, each VAU 500 comprises a Policing Module 502, an Accounting Module 504, and an ED Record 506. In some embodiments, each VAU 500 may optionally also include a Synchronization Module 508. In certain embodiments, at least the Policing and Accounting modules 502 and 504 may be combined together. In certain embodiments, at least some of the content of the ED Record 506 may be incorporated within the Policing and Accounting modules 502 and 504.

The ED Record 506 may store device administration data for a specific ED 102 connected to an AP 302 via a respective link 306. It is contemplated that the format of the ED Record 506 will be selected based on the specific session administration functions that need to be performed, and this, in turn, will tend to follow the functional capabilities of the network 300. For the specific example of a network 300 implemented under the 4G or 5G standards, the ED Record 506 may be formatted into a Policies Portion 510, a Metrics Portion 512, a Policing Portion 514 and an Internetworking Portion 516.

The Policies Portion 510 may be configured to store policy information associated with the specific ED. For example, the policy information may include information defining a Service Level Agreement (SLA) associated with the specific ED, such as, for example, Quality of Service (QoS) parameters, latency specifications, usage limits, and rules governing interworking and roaming etc. In some embodiments, the policy information may include parameters that define one or more policies pertaining to the ED 102. In some embodiments, the policy information may include an identifier that may be used by the VAU 500 (or its Synchronization Module 508) to access the appropriate policy parameters from a remote location (such as the SPS 309, for example).

The Metrics Portion 512 may be configured to store at least one statistic and (optionally) other data related to the respective ED. For example, the Metrics Portion 512 may be used to store a respective identifier for each service session in which the ED is participating, and metrics related to each such services session. Example metrics may include a total utilization (e.g. number of packets sent or received, total bytes sent or received, etc.), an average latency, and an average bandwidth (e.g. packets or bytes per second). Different, or additional metrics may also be measured, as appropriate. The measured metrics may be stored in the Metrics Portion 512, and may be used to compute various statistics pertaining to the ED 102. These statistics may also be stored in the Metrics Portion 512 and used by the Policing Module 502 to monitor compliance with one or more of the policies (such as usage limits) associated with the ED 102.

The Policing Portion 514, may be configured to store policing information associated with the specific ED 102. For example, the policing information may comprise rules that define actions to be taken to enforce the policies associated with the ED. For example, the policing information may define an action to be taken when the total usage of the ED exceeds a predetermined usage limit (which may be defined in the Policies Portion 510). For example, an SLA associated with the specific ED may define that the QoS is to be reduced to a predetermined level when the total usage of the ED (for example, packets or bytes sent and/or received by the ED) exceeds a predetermined usage limit. In this case, both the predetermined QoS level and the predetermined usage limit may be included in the policy information stored in the in the Policies Portion 510 of the ED Record 506, while the specific policing rule (e.g. "On match (total utilization, utilization limit); Reduce the QoS") may be defined in the policing information stored in the Policing Portion 514 of the ED Record 506. In some embodiments, the policing information may include parameters that define one or more policing rules. In some embodiments, the policing information may include an identifier that may be used by the VAU 500 to access the appropriate policing rule(s) from a remote location (such as SPS 309 and PCC 311, for example).

The Internetworking Portion 516 may be configured to store Internetworking information associated with the specific ED. For example, an SLA associated with the specific ED may define that the ED is permitted to access certain networks or use certain protocols, but not others. In addition, the SLA may define rules governing roaming, and such rules may be included in the Internetworking information.

The Policing Module 502 may operate to implement the respective policing rules associated with the specific ED 102. For example, the Policing Module 502 may use metrics and/or statistics stored in the Metrics Portion 512 of the ED Record 506 to implement policing rules defined by the policing information stored in the Policing Portion 514 of the ED Record 506. In some embodiments, the Policing Module 502 may use the policing information stored in the Policing Portion 514 to access appropriate policing rules stored at a remote location, such as, for example, the HSS 310.

The Accounting Module 504 may operate to control the VAU 500 to measure a predetermined set of metrics associated with traffic flows to and from the specific ED 102. Any suitable metrics may be measured. Example metrics may include, total numbers of packets or bytes traversing the AP (in either or both of the Uplink and Downlink directions) associated with service sessions of the ED, and mean latency experienced by packets associated with service sessions of the ED. In some embodiments, the Accounting Module 504 may also use the measured metrics to calculate statistics pertaining to one or more service sessions of the ED. For example, the total numbers of packets or bytes traversing the AP (in either or both of the Uplink and Downlink directions) associated with service sessions of the ED may be accumulated to calculate a usage of the ED over a specified time period such as, for example, a subscription billing period.

The Synchronization Module 508 may operate to synchronize administration data in VAU 500 so as to provide continuity of device monitoring and policy enforcement, as will be described in further detail below.

In some embodiments, a VAU 500 for a specific ED 102 may be instantiated when that ED first establishes a wireless connection and requests services from an AP 302. In some embodiments, the AP 302 may instantiate a VAU 500 directly, based on its own management and orchestration capability. For example, when AP 302 receives a first service request from an ED 102, the AP 302 may instantiate a new VAU 500 for that ED 102, based on one or more predetermined VAU templates. In other embodiments, the AP 302 may instantiate a VAU 500 indirectly, by sending an appropriate request message to a management/orchestration function of the network. In such cases, the request message may include information identifying any one or more of: the requesting access point 302, the specific ED 102, a particular interface used for traffic to and from the specific ED 102. For example, when AP 302 receives a first service request from an ED 102, the AP 302 may send a request message to a management/orchestration function. In response to receipt of the request message, the management/orchestration function may instantiate a new VAU 500 for that ED 102, based on one or more predetermined VAU templates.

In some embodiments, a VAU template may include one or more fields of device administration data that are pre-populated with default information. For example, at least some fields of the Metrics Portion 512 of an ED Record 506 may be pre-populated with default values (such as for example "0"), so that these default values will be present in the fields of device administration data which are maintained when the VAU 500 is instantiated.

In some embodiments, one or more fields of device administration data may be populated, after instantiation of the VAU, with information obtained from another location (such as, for example, any one or more of the SPS 309, HSS 310, PCC 311 and AMF/MME 312). For example, the Synchronization Module 508 may be configured to obtain Policy Information and Policing Rules applicable to the specific ED from any one or more of the SPS 309, HSS 310, PCC 311 and AMF/MME 312.

In some embodiments, the Synchronization Module 508 may operate to transfer device administration data to another VAU 500. For example, during a Hand-Over procedure involving a specific ED, the Synchronization Module 508 of a source VAU 500A may transfer device administration data of that ED to a target VAU 500B. In some embodiments, all of the device administration data held by the source VAU 500A for the specific ED may be transferred to the target VAU 500B. For example, the Synchronization Module 508 may send the entire ED record 506 to the target VAU 500B. In other embodiments, only a portion of the device administration data held by the source VAU 500A for the specific ED may be transferred to the target VAU 500B. For example, the Synchronization Module 508 may send only selected portions or fields extracted from the ED Record 506 to the target VAU.

In some embodiments, the Synchronization Module 508 may operate to receive device administration data received from another VAU 500. For example, during a Hand-Over procedure involving a specific ED, the Synchronization Module 508 of the target VAU 500B may receive device administration data of that ED from the source VAU 500A. In some embodiments, the Synchronization Module 508 of the target VAU may merge the received administration data into its local ED Record 506. In some embodiments, the Synchronization Module 508 of the target VAU may populate some fields of device administration data pertaining to a specific ED using information received from a source VAU, and populate other fields of device administration data pertaining to that ED using information received from another location in the network 300, such as an SPS 309 for example.

As described above, the target VAU 500B may be populated with any suitable combination of default values and information obtained from another location in the network. In general, two alternative scenarios may be described, as follows:

In one scenario, the VAU 500B may be populated with policy and policing information obtained from another location in the network. This scenario has an advantage in that the policy and policing information contained in the VAU 500B is accurate from the time of instantiation of the VAU 500B. However, this approach also means that the delay incurred to instantiate the VAU 500B is increased due to the time required to request and obtain the policy and policing information.

In an alternative scenario, the VAU 500B may be populated with default policy and policing information that is subsequently updated based on the Device Administration Data received from the initial VAU 500A. This scenario has an advantage in that the VAU 500B can be instantiated with minimum delay, because there is no need to request and receive policy and policing information from elsewhere in the network. However, this approach also means that the default policy and policing information may not accurately reflect the SLA associated with the ED, until the policy and policing information is updated based on the Device Administration Data received from the initial VAU 500A.

If desired, hybrid scenarios may also be implemented, whereby the policy and policing information contained in the VAU 500B is initially populated using a combination of information obtained from elsewhere in the network and default values that are subsequently updated based on the Device Administration Data received from the initial VAU 500A.

Figure 6:
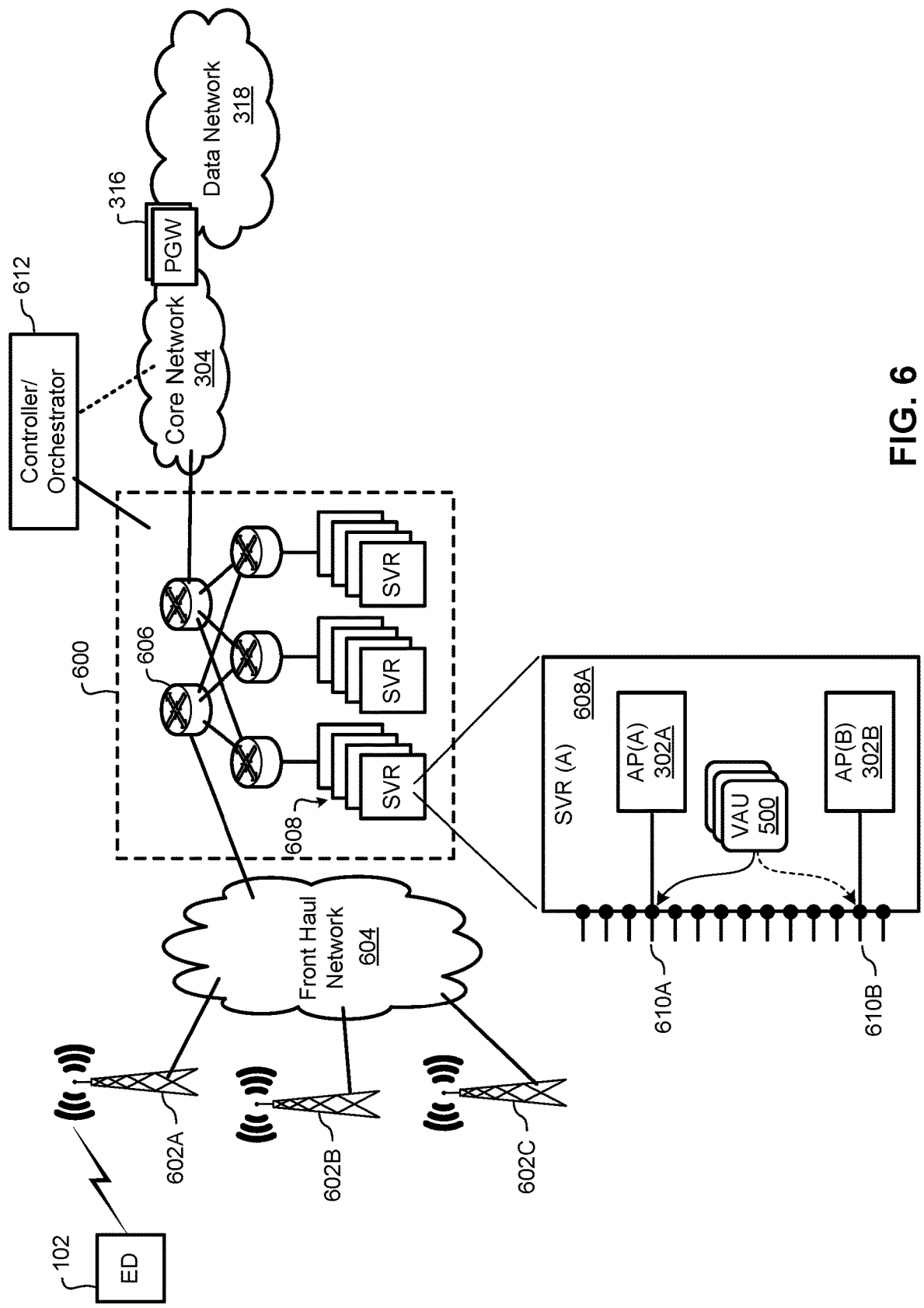
FIG. 6 is a block diagram illustrating elements of a mobile network in which embodiments of the present invention may be deployed in accordance with another representative embodiment of the present invention.

As noted above, an AP 302 may be implemented as an electronic device or system as described above with reference to FIG. 1, or as a virtualized entity instantiated on a server 200 as described above with reference to FIG. 2. Embodiments in which an AP 302 is implemented as a virtualized entity are particularly applicable to Centralized Radio Access network (CRAN) environments. FIG. 6 illustrates an example embodiment, in which a data center 600 is connected to core network 304 and a set of radio antennas 602A-C via a Front Haul network 604. The data center 600 may include one or more routers 606 and servers 608. At least some of the servers 608 may host APs 302. In order to support traffic flows between an ED 102 and its host AP 302, the host AP 302 may be connected to a designated interface 610 (which may be either a physical interface of the server or a virtual interface abstracted from the physical interface by Virtualization Layer 208, for example) of its host server 608, and traffic to and from the ED 102 routed (by the routers 606, for example) through that interface 610. Traffic monitoring and policy enforcement functions pertaining to the ED 102 may be implemented by a VAU 500 which is configured to monitor traffic to and from the ED 102. In some embodiments, instantiation of APs 302 and VAUs 500, and coordination of their functions may be managed by a Controller/Orchestration function 612, which may be connected to the data center 600 or accessible through the core network 304. Ion some embodiments, the Controller/Orchestration function 612 may be a virtualized entity within the data center 600, on either the same server 608 as the VAU 500 or on a different server. In some embodiments, the Controller/Orchestrator function 612 may be provided by MANagement and Orchestration (MANO) functions and Service Oriented Network Auto-Creation (SONAC) functions.

In some embodiments, the VAU 500 may be configured to monitor traffic to and from the ED 102 associating the VAU 500 with any one or more of the following monitoring points:

The host interface 610 through which traffic to and from the ED 102 is routed;
A sub-interface (such as, for example, a Virtual Local Area Network (VLAN)) of the host interface 610;
A hypervisor networking entity (such as Application Platform Services 212, FIG. 2) linking the host interface 610 to the host AP 302; and
An interface of the host AP 302.

Continuity of traffic monitoring and policy enforcement can be maintained as the ED 102 moves from the coverage area of one antenna 602A to another antenna 602B by a Hand-Over procedure in which the traffic to and from the ED 102 is re-routed (through a new host interface 610B, for example) to a new host AP 302B and reconfiguring the VAU 500 to move its monitoring point as needed to continue monitoring the traffic to and from the ED 102.

In the embodiment of FIG. 6, the APs 302A and 302B, the designated interfaces 610A and 610B, and the VAU 500 are all resident on a common server 608A. In such an embodiment, moving the monitoring point of the VAU 500 may be accomplished by passing an identifier of the new monitoring point to the VAU 500. Based on the received identifier, the VAU 500 may interact with the new monitoring point (for example using an Application Programming interface (API) associated with the monitoring point) to create an association between the VAU 500 and the new monitoring point. For example, the source AP 302A may pass an identifier of the VAU 500 to the target APs 302B, which can then pass an identifier of the new monitoring point (such as interface 610B) to the VAU 500. Based on the received identifier, the VAU 500 may interact with the monitoring point to create an association between the VAU 500 and the monitoring point. In some embodiments, the Controller/Orchestration function 612 may not be required during the Hand-Over procedure, if the APs 302A and 302B are capable of interacting with each other and the VAU 500 to exchange the required information. In other embodiments, the APs 302A and 302B may interact with the Controller/Orchestrator function 612 to pass the required information to the VAU 500.

Figure 7:
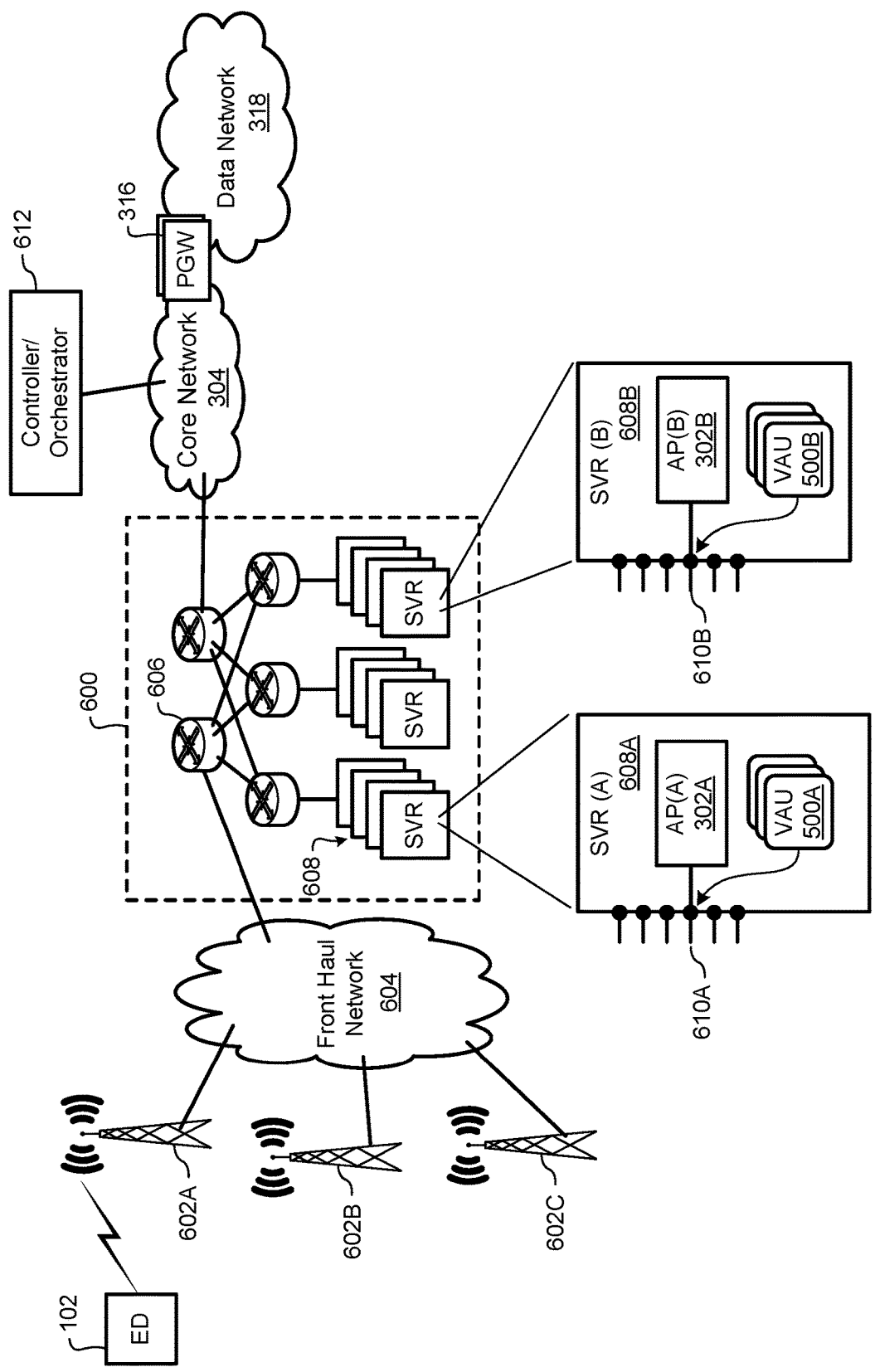
FIG. 7 is a block diagram illustrating elements of a mobile network in which embodiments of the present invention may be deployed in accordance with another representative embodiment of the present invention.

FIG. 7 illustrates an embodiment in which the APs 302A and 302B are instantiated on different servers 608A and 608B of the data center 600, and VAUs 500 are instantiated and controlled by the Controller/Orchestration function 612. In the example of FIG. 7, the Controller/Orchestrator function 612 is implemented as a network function that may be accessed through the core network 304. Alternatively, the Controller/Orchestrator function 612 may be implemented within the data center 600, for example as a virtualized entity on either the same server 608 as the VAU 500 or on a different server. In the example of FIG. 7, continuity of traffic monitoring and policy enforcement can be maintained as the ED 102 moves from the coverage area of one antenna 602A to another antenna 602B by instantiating a new VAU 500B associated with the new interface 610B through which traffic to and from the ED 102 is re-routed, and moving administrative data from the source VAU 500A to the new VAU 500B, as described below with reference to FIGS. 8A and 8B.

Figure 8A:
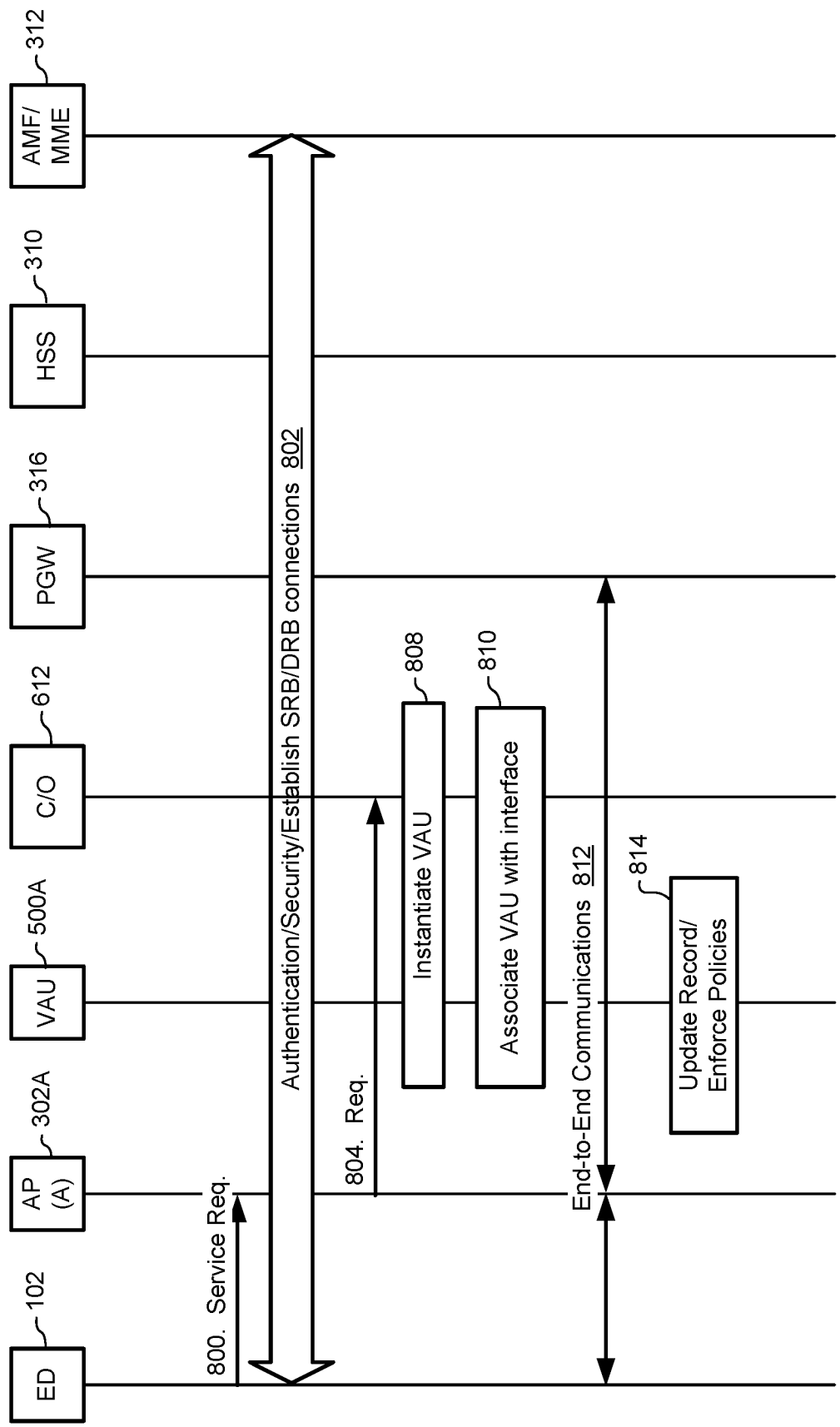
FIGS. 8A and 8B are message flow diagram illustrating example session establishment and Hand-Over processes in the network of FIG. 7.
Figure 8B:
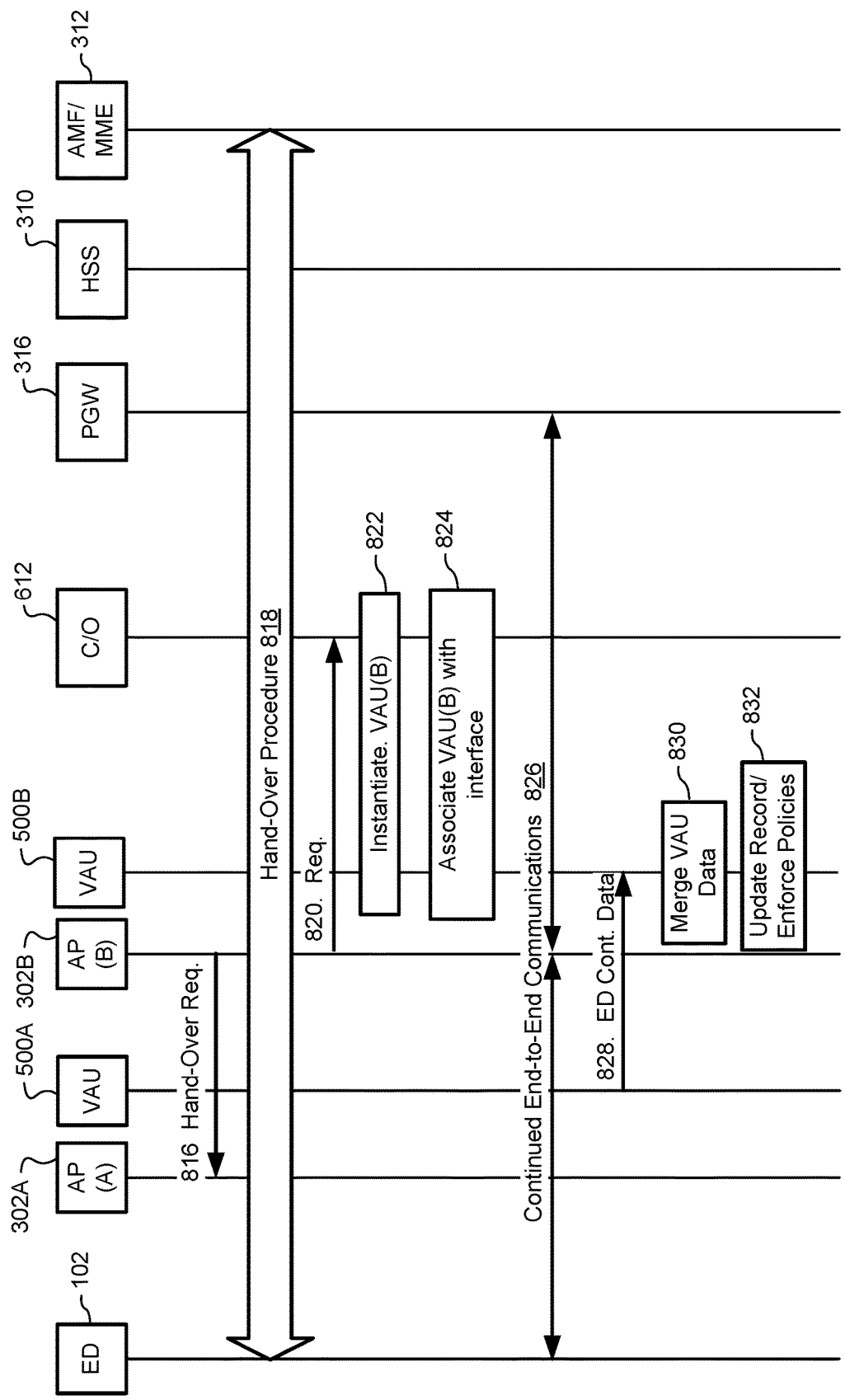

FIGS. 8A and 8B are message flow diagrams illustrating example session establishment and Hand Over procedures in the network of FIG. 7. The examples of FIGS. 8A and 8B assume that the methods are implemented in a network of the type contemplated by the 4G and 5G standards, but is anchorless, so that anchor nodes (such as an SGW 308 and PGW 316) and GTP tunnels 320 are not involved in setting up or managing communications sessions. Furthermore, while one or more PGWs 316 (which, in the example of FIG. 7 may be simply a router) may be present to enable traffic flows to and from a packet network 318 (such as the internet), the lack of GTP tunnels 320 associated with the specific ED 102 means that device administrative functions cannot be located at either the SGW 308 or the PGW 316.

As may be seen in FIG. 8A, session establishment may begin with a service request 800 that is sent from the mobile electronic device (ED) 102 to an initial access point 302A. Upon receipt of the service request, the access point 302A may operate to establish (at 802) connections and associations needed to support the requested service. Known methods may be used to access the HSS 310 and AMF/MME 312 in order to authenticate the ED 102 and obtain service requirements and security codes (such as encryption keys), as well as to set up connections through the network to a PGW 316 for example. In addition, the access point 302A may send a request message (at 804) to the Controller/Orchestrator function 612 to trigger instantiation of a VAU 500 to store device administration data and implement traffic monitoring, reporting and policy enforcement functions pertaining to the ED 102. In some embodiments, the request message may include any one or more of: an identifier of the requesting access point 302A, an identifier of the ED 102, information identifying a location of the requesting access point 302A, information regarding one or more interfaces of the requesting access point 302A, information identifying a monitoring point to be used for traffic monitoring and policy enforcement, and information identifying a communication channel of the access point 302A. Example information identifying the monitoring point to be used may include any of: an identifier of a host interface 610 through which traffic to and from the ED 102 is routed; an identifier (such as a VLAN identifier) of a sub-interface of the host interface 610; an address of a hypervisor networking entity (such as Application Platform Services 212, FIG. 2) linking the host interface 610 to the host AP 302; and an identifier of an interface of the host AP 302. Following receipt of the request message, the Controller/Orchestrator function 612 may instantiate (at 808) a new VAU 500 on the same server that is hosting the requesting access point 302A. Once the new VAU 500 has been instantiated, the Controller/Orchestrator function 612 may associate (at 810) the new VAU 500 with a suitable monitoring point (which, in cases where the request message includes information identifying the monitoring point, will correspond with the identified monitoring point), so that the VAU 500 can monitor traffic flows to and from the ED 102. In some embodiments, the Controller/Orchestrator function 612 may associate (at 810) the VAU 500 with the monitoring point by linking the VAU 500 to a host interface 610, such that traffic to and from the ED 102 will traverse the VAU 500. In some embodiments, the Controller/Orchestrator function 612 may associate (at 810) the VAU 500 with monitoring point by providing an identifier of the monitoring point to the VAU 500. Based on the received identifier, the VAU 500 can interact with the monitoring point (as described above) to implement required traffic monitoring processes on the monitoring point. In some embodiments, the Controller/Orchestrator function 612 may associate (at 810) the VAU 500 with the monitoring point by providing information identifying a communication channel of the access point 302A to the VAU 500. Based on the received information, the VAU 500 may interact with the access point 302A (for example using an Application Programming Interface (API)) to obtain information regarding the new monitoring point which may be used by the VAU 500 to implement required traffic monitoring processes on the new monitoring point. As noted above, at the time of instantiation, the VAU 500 may be populated with any suitable combination of default values and information obtained from another location in the network, such as the SPS 309 and PCC 311, for example.

Once connections and associations needed to support the requested service have been established, end-to-end traffic flows associated with the service session can begin (at 812). In some embodiments operation of the VAU 500 is facilitated by the Controller/Orchestrator function 612 using the new monitoring point. During the course of the service session, the Accounting Module 504 of the VAU 500 may operate (at 814) in accordance with the Policy information stored in the ED Record 506 to monitor the traffic flows to and from the ED to acquire relevant metrics and statistics, and generate reports to enable billing of the customer. At the same time, the Policing Module 502 may operate in accordance with the Policing rules stored in the ED Record 506 to enforce the policies that pertain to the ED 102.

Referring to FIG. 8B, session Hand-Over may begin when a new access point 302B sends a Hand-Over request 816 to the initial access point 302A. In response to the Hand-Over request 816, the two access points 302A and 302B may interact (at 818) with each other and network functions (such as, for example, any one or more of the SPS 309, HSS 310, AMF/MME 312 or NEF 314) to establish new connections through the new access point 302B, and re-route end-to-end traffic flows associated with the ED 102. In addition, the new access point 302B may send a request message (at 820) to the Controller/Orchestrator function 612 to trigger instantiation of a new VAU 500 to store device administration data and implement monitoring and policy enforcement functions pertaining to the ED 102. In some embodiments, the request message may include any one or more of: an identifier of the new access point 302B, an identifier of the ED 102, information identifying a location of the requesting access point 302A, information regarding one or more interfaces of the requesting access point 302A, information identifying the new monitoring point, and information identifying a communication channel of the new access point 302B. Example information identifying the new monitoring point may include any of: an identifier of a host interface 610B through which traffic to and from the ED 102 is re-routed; an identifier (such as a VLAN identifier) of a sub-interface of the host interface 610B; an address of a hypervisor networking entity (such as Application Platform Services 212, FIG. 2) linking the host interface 610B to the new host AP 302B; and an identifier of an interface of the new host AP 302B. Following receipt of the request message, the Controller/Orchestrator function 612 may instantiate (at 822) a new VAU 500 on the same server that is hosting the new access point 302B. Once the new VAU 500B has been instantiated, the Controller/Orchestrator function 612 may associate (at 824) the new VAU 500B with a new monitoring point (which, in cases where the request message includes information identifying the new monitoring point, will correspond with the identified new monitoring point), so that the new VAU 500 can monitor traffic flows to and from the ED 102. In some embodiments, the Controller/Orchestrator function 612 may associate (at 824) the new VAU 500B with the new monitoring point by linking the VAU 500B to the monitoring point, such that traffic to and from the ED 102 will traverse the VAU 500B. In some embodiments, the Controller/Orchestrator function 612 may associate (at 824) the new VAU 500B with the new monitoring point by providing an identifier of the new monitoring point to the VAU 500B. Based on the received identifier, the VAU 500B may interact with the new monitoring point (for example using an Application Programming Interface (API)) to implement required traffic monitoring processes on the new monitoring point. In some embodiments, the Controller/Orchestrator function 612 may associate (at 824) the new VAU 500B with the new monitoring point by providing information identifying a communication channel of the new access point 302B to the VAU 500B. Based on the received information, the VAU 500B may interact with the new access point 302B (for example using an Application Programming Interface (API)) to obtain information regarding the new monitoring point which may be used by the VAU 500B to implement required traffic monitoring processes on the new monitoring point. As noted above, at the time of instantiation, the new VAU 500B may be populated with any suitable combination of default values and information obtained from another location in the network, such as the SPS 309 and PCC 311, for example. Once connections and associations needed to support the ED 102 have been established, end-to-end traffic flows to and from the ED 102 can continue (at 826). In some embodiments operation of the VAU 500B is facilitated by the Controller/Orchestrator function 612 using the new monitoring point.

In order to ensure continuity of traffic monitoring and policy enforcement, the respective Synchronization Modules 508A and 508B in the initial and new VAUs 500A and 500B may cooperate to update the device administration data in the new VAU 500B. Thus, in the example of FIG. 8B, the Synchronization Module 508A in the initial VAU 500A may send (at 828) Device Administration Data pertaining to the ED 102 to the new VAU 500B. In the example of FIG. 8B, the Device Administration Data sent to the new access point 500B is considered to represent a portion (but not all) of the content of the ED Record 506 of the initial VAU 500A associated with the initial access point 500A. For example, the Synchronization Module 514A of the initial VAU 500A may only send the contents of the Metrics Portion 512 of its ED Record 506 to the new VAU 500B. Upon receipt of the Device Administration Data pertaining to the ED 102 from the initial VAU 500A, the Synchronization Module 508B of the new VAU 500B may merge (at 830) the received Device Administration Data into its ED Record 506. Once this merge operation has been completed, the new VAU 500B will contain the same information as the initial VAU 500A at the time of the Hand-Over. Accordingly, continuity of traffic monitoring and policy enforcement is maintained through the Hand-Over procedure. Thereafter, the Accounting Module 504B of the new VAU 500B may operate in accordance with the Policy information stored in the ED Record 506 to update (at 832) the ED Record 506 by monitoring the traffic flows to acquire relevant metrics and statistics, and generate reports to enable billing of the customer. At the same time, the Policing Module 502B may operate in accordance with the Policing rules stored in the ED Record 506 to enforce the policies that pertain to the ED 102.

As may be appreciated, in the embodiment of FIGS. 7 and 8, during a Hand-Over procedure, a new VAU 500B is instantiated in association with the new access point 302B, and then at least some of the device administration data from the initial VAU 500A is supplied to the new VAU 500B. VAU 500.

Figure 9:
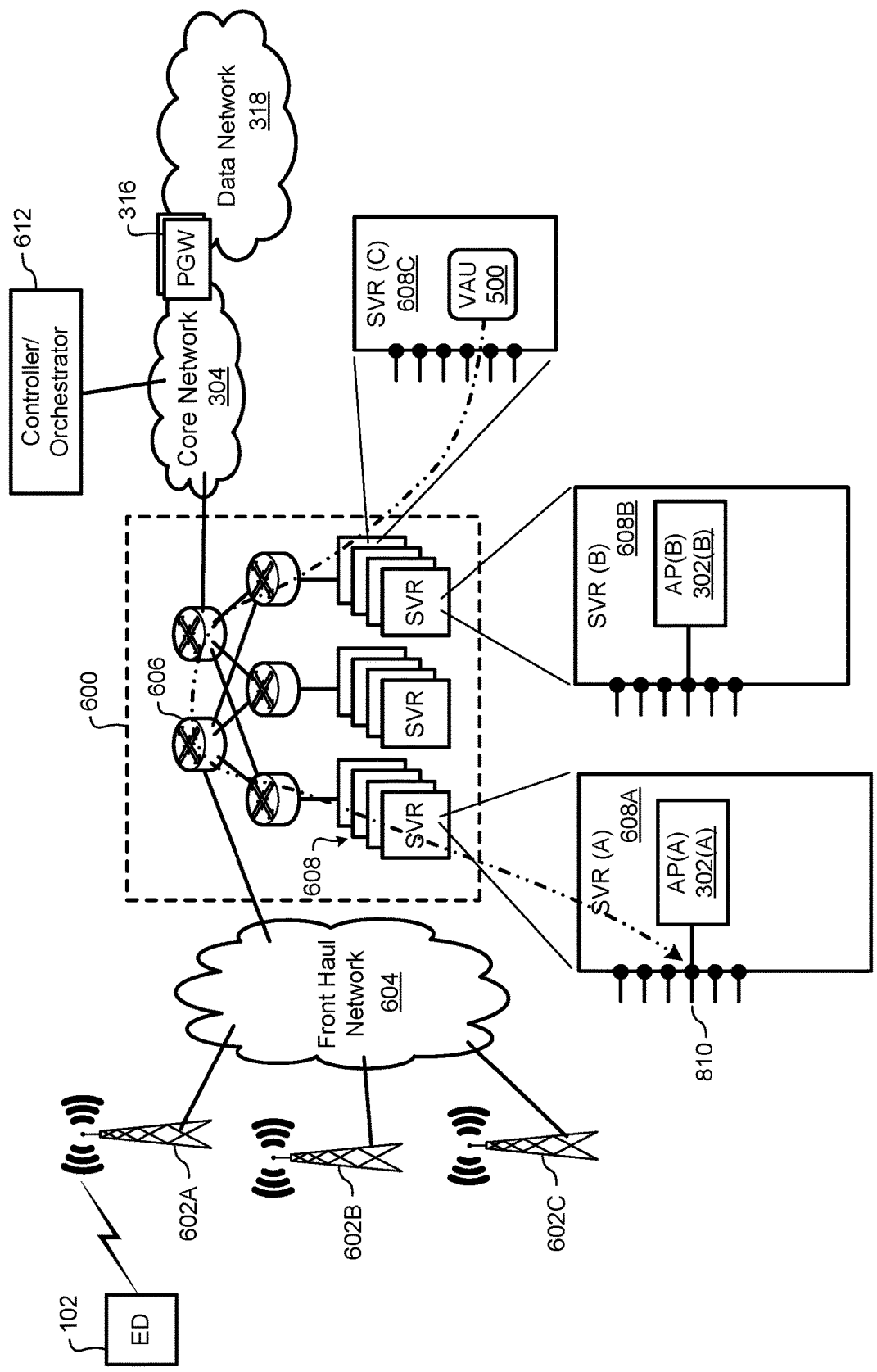
FIG. 9 is a block diagram illustrating elements of a mobile network in which embodiments of the present invention may be deployed in accordance with another representative embodiment of the present invention.

FIG. 9 illustrates an embodiment in which a single VAU 500 is instantiated for a particular ED 102 when that ED initially connects to the network 300, and remains in place (i.e. is persistent) for as long as the ED 102 remains connected to the network. In this case, the VAU 500 for the particular ED 102 may be instantiated on any desired server 608, and configured to monitor traffic flows at any suitable monitoring point. For example, upon receipt of a request to instantiate a VAU 500 for a particular ED 102 (e.g. FIG. 8A at 804), the Controller/Orchestrator function 612 may select a server 608 according to any suitable criteria, and instantiate the VAU 500 on the selected server 608. Example criteria may include load balancing among servers 608 of a data center 600; traffic load balancing among routers 606 within a data center 600; minimization of signaling latency, etc. Once the VAU 500 has been instantiated, it can be configured to monitor traffic flows at any suitable monitoring point associated with the AP 302 hosting the ED 102, so that the VAU 500 can perform its traffic monitoring, reporting and policy enforcement functions in respect of the particular ED 102. In some embodiments, the VAU 500 may be configured to monitor traffic flows at a selected monitoring point by linking the VAU 500 to the monitoring point, such that traffic to and from the ED 102 will traverse the VAU 500. In some embodiments, the VAU 500 may be configured to monitor traffic flows at a selected monitoring point by providing an identifier of the selected monitoring point to the VAU 500. Based on the received identifier, the VAU 500 can interact with the monitoring point (for example using an Application Programming Interface (API) of the interface) to implement required traffic monitoring processes on the monitoring point.

During a Hand-Over process, the Controller/Orchestrator function 612 may respond to a request from the new AP 302B (eg. FIG. 8B at 820) by reconfiguring the VAU 500 such that it will monitor traffic flows at a new monitoring point associated with the new AP 302B, as described above with reference to FIG. 6. By this means, continuity of traffic monitoring, reporting and policy enforcement functions pertaining to the particular ED 102 is maintained without requiring the instantiation of a new VAU 500 associated with the new AP 302B, and subsequent transfer of device administration data. In such embodiments, the Synchronization Module 508 may be omitted from the VAU 500.

An advantage of the embodiment of FIG. 9 is that a VAU 500 can be instantiated on any suitable host. Thus, for example, an VAU 500 may be instantiated on a server 608 of a data center 600 as shown in FIG. 9, an edge computing platform, or even the ED 102 itself.

Figure 10:
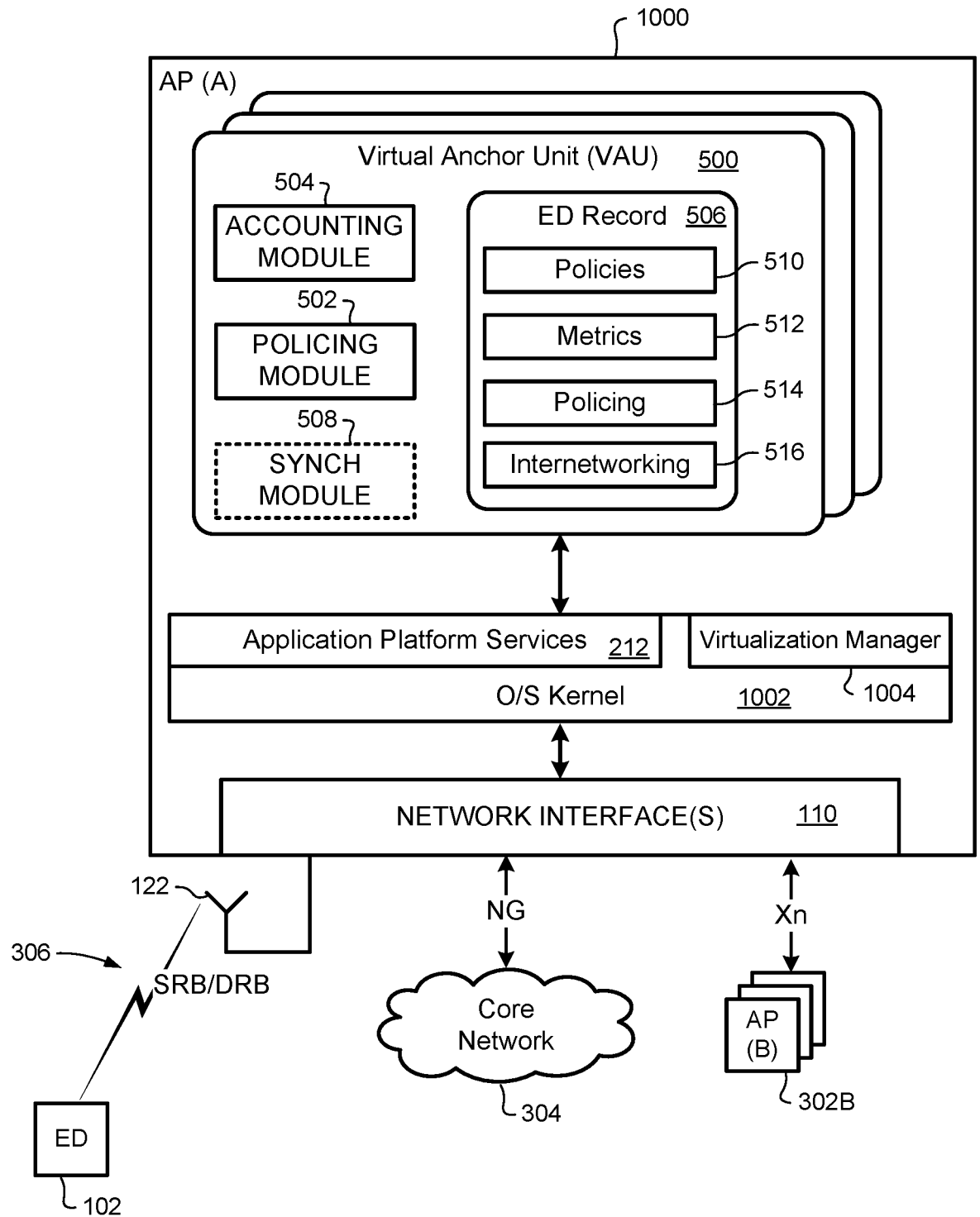
FIG. 10 is a block diagram illustrating elements of an access point in accordance with another representative embodiment of the present invention.

FIG. 10 is a block diagram illustrating elements of a VA-enabled access point 1000 in accordance with representative embodiments of the present invention. As with the APs 302A-B described above with reference to FIG. 3, the VA-enabled access point 1000 may be provided as eNodeB or gNB nodes, which may be either constructed in accordance with the system 100 described above with reference to FIG. 1, or a virtualized entity instantiated in a server 200 as described above with reference to FIG. 2. In general terms, a VA-enabled access point 1000 may perform the functions of a conventional access point (such as APs 302A-B described above with reference to FIGS. 3-9, for example), while also providing virtual anchor (VA) functionality to support device administration functions conventionally performed by an anchor node. It will be appreciated that the architecture of a VA-enabled access point 1000 will depend on the chosen virtualization technology. The example embodiment of FIG. 10 is based on Operating-System-Level virtualization, in which the VA-enabled access point 1000 generally comprises an operating system kernel 1002 hosting one or more virtual anchor units (VAUs) 500 each of which is provided as a respective isolated user space instance executing on the kernel 1002.

In some embodiments, the VA-enabled access point 1000 may include Application Platform Services 212 (which may also be provided as a user space instance executing on the kernel 1002) providing networking and connectivity services as described above with reference to FIG. 2. In some embodiments, the VA-enabled access point 1000 may include a Virtualization Manager 1004 (which may also be provided as a user space instance executing on the kernel 1002) configured to manage the instantiation of VAUs 500 as will be described in greater detail below. In some embodiments, the Virtualization Manager 1004 may be incorporated within the Application Platform Services 212. In some embodiments, at least the Virtualization Manager 1004 may be incorporated within a MANagement and Orchestration (MANO) function of the network.

In some embodiments, the Virtualization Manager 1004 may instantiate a VAU 500 for a specific ED 102 when that ED first establishes a wireless connection and requests services from the AP 1000. In some embodiments, the Virtualization Manager 1004 may instantiate a VAU 500 directly, based on its own management and orchestration capability. In other embodiments, the Virtualization Manager 1004 may instantiate a VAU 500 indirectly, by sending an appropriate request message to a management/orchestration function (such as Controller/Orchestrator function 612 described above with reference to FIGS. 6-9). In such cases, the request message may include information identifying any one or more of: the requesting VA-enabled access point 500, the specific ED 102, a particular interface used for traffic to and from the specific ED 102. For example, when an AP 1000 receives a first service request from an ED 102, the Virtualization Manager 1004 may instantiate (or trigger instantiation of) a new VAU 500 for that ED 102, based on one or more predetermined VAU templates.

In some embodiments, the Synchronization Module 508 may operate to transfer device administration data to another VAU 500 hosted, for example by another AP 500. For example, during a Hand-Over procedure involving a specific ED, the Synchronization Module 508 of the source VAU 500 may transfer device administration data of that ED to the target VAU. In some embodiments, all of the device administration data held by the source VAU for the specific ED may be transferred to the target VAU. For example, the Synchronization Module 508 may send the entire ED record 506 to the target VAU. In other embodiments, only a portion of the device administration data held by the source VAU for the specific ED may be transferred to the target VAU. For example, the Synchronization Module 508 may send only selected portions or fields extracted from the ED Record 506 VAU 500 to the target VAU.

In some embodiments, the Synchronization Module 508 may operate to receive device administration data received from another VAU 500. For example, during a Hand-Over procedure involving a specific ED, the Synchronization Module 508 of the target VAU may receive device administration data of that ED from the source VAU. In some embodiments, the Synchronization Module 508 of the target VAU may merge the received administration data into its local ED Record 506. In some embodiments, the Synchronization Module 508 of the target VAU may populate some fields of device administration data pertaining to a specific ED using information received from a source VAU, and populate other fields of device administration data pertaining to that ED using information received from another location in the network 300, such as an SPS 309 for example.

Figure 11A:
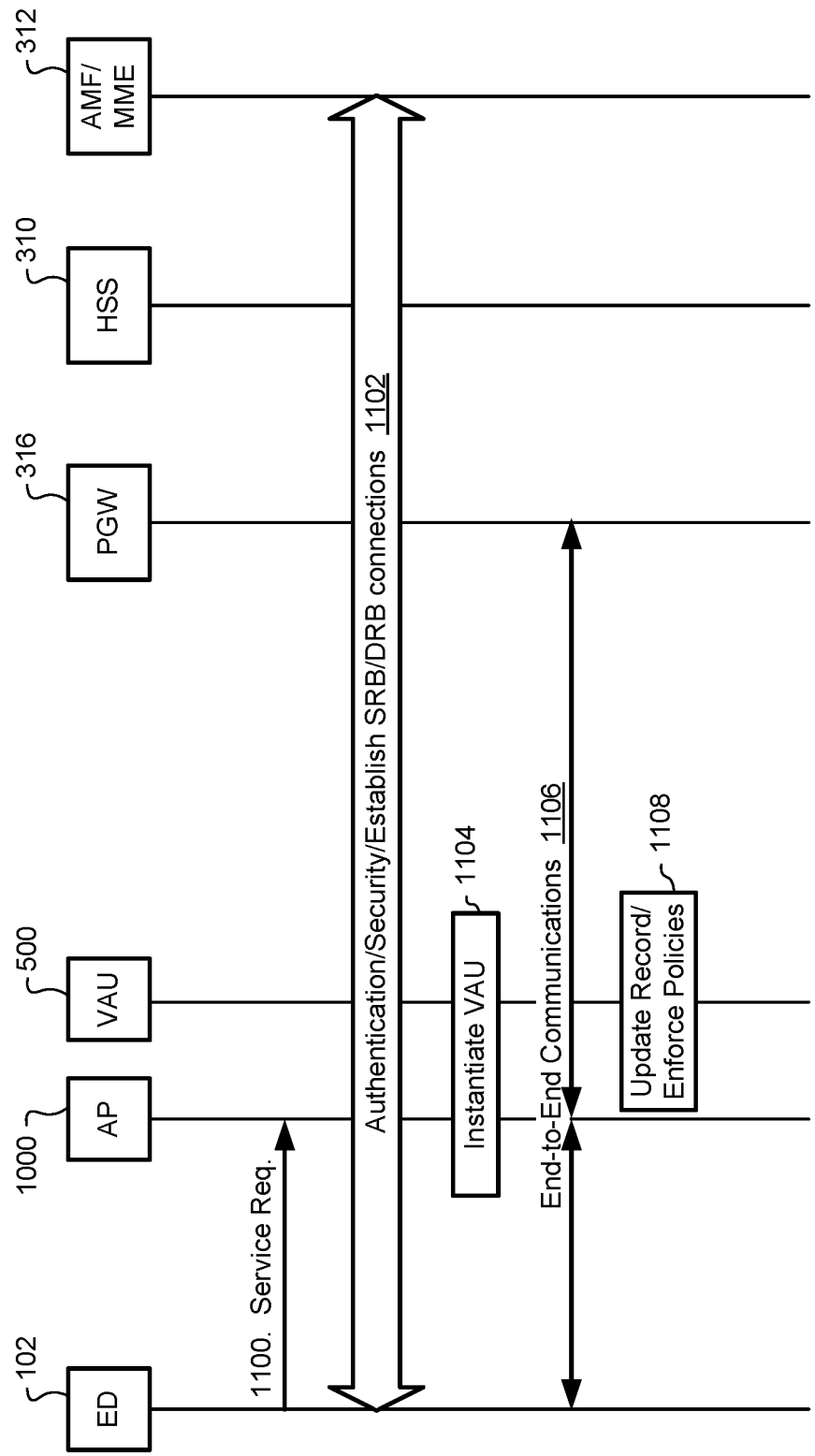
FIGS. 11A and 11B are message flow diagrams illustrating an example session establishment and Hand-Over processes, respectively, in accordance with the embodiment of FIG. 10.

FIG. 11A is a message flow diagram illustrating an example session establishment procedure in accordance with a representative embodiment of the present invention. The example of FIG. 11A assumes that the method is implemented in a network of the type contemplated by the 4G and 5G standards, but is anchorless, so that anchor nodes (such as an SGW 308 and PGW 316) and GTP tunnels 320 are not involved in setting up or managing communications sessions. Furthermore, while one or more PGWs 316 (which, in the example of FIGS. 11A-11B, may be simply a router) may be present to enable traffic flows to and from a packet network 318 (such as the internet), the lack of GTP tunnels 320 associated with the specific ED 102 means that device administrative functions cannot be located at either the SGW 308 or the PGW 316.

As may be seen in FIG. 11A, session establishment may begin with a service request 1100 that is sent from the mobile electronic device (ED) 102 to a VA-enabled access point 1000. Upon receipt of the service request, the access point 1000 may operate to establish (at 1102) connections and associations needed to support the requested service. Known methods may be used to access the HSS 310 and AMF/MME 312 in order to authenticate the ED 102 and obtain service requirements and security codes (such as encryption keys), as well as to set up connections through the network to a PGW 316 for example. In addition, the Virtualization Manager 1004 of the VA-enabled access point 1000 may instantiate (at 1104) a VAU 500 to store device administration data and implement traffic monitoring and policy enforcement functions pertaining to the ED 102. As noted above, the VAU 500 may be populated with any suitable combination of default values and information obtained from another location in the network, such as the SPS 309 and PCC 311, for example.

Once connections and associations needed to support the requested service have been established, end-to-end traffic flows associated with the service session can begin (at 1106). During the course of the service session (at 608), the Accounting Module 504 of the VAU 500 may operate in accordance with the Policy information stored in the ED Record 506 to monitor (at 1108) the traffic flows to acquire relevant metrics and statistics, and generate reports to enable billing of the customer. At the same time, the Policing Module 502 may operate in accordance with the Policing rules stored in the ED Record 506 to enforce the policies that pertain to the ED 102.

Figure 11B:
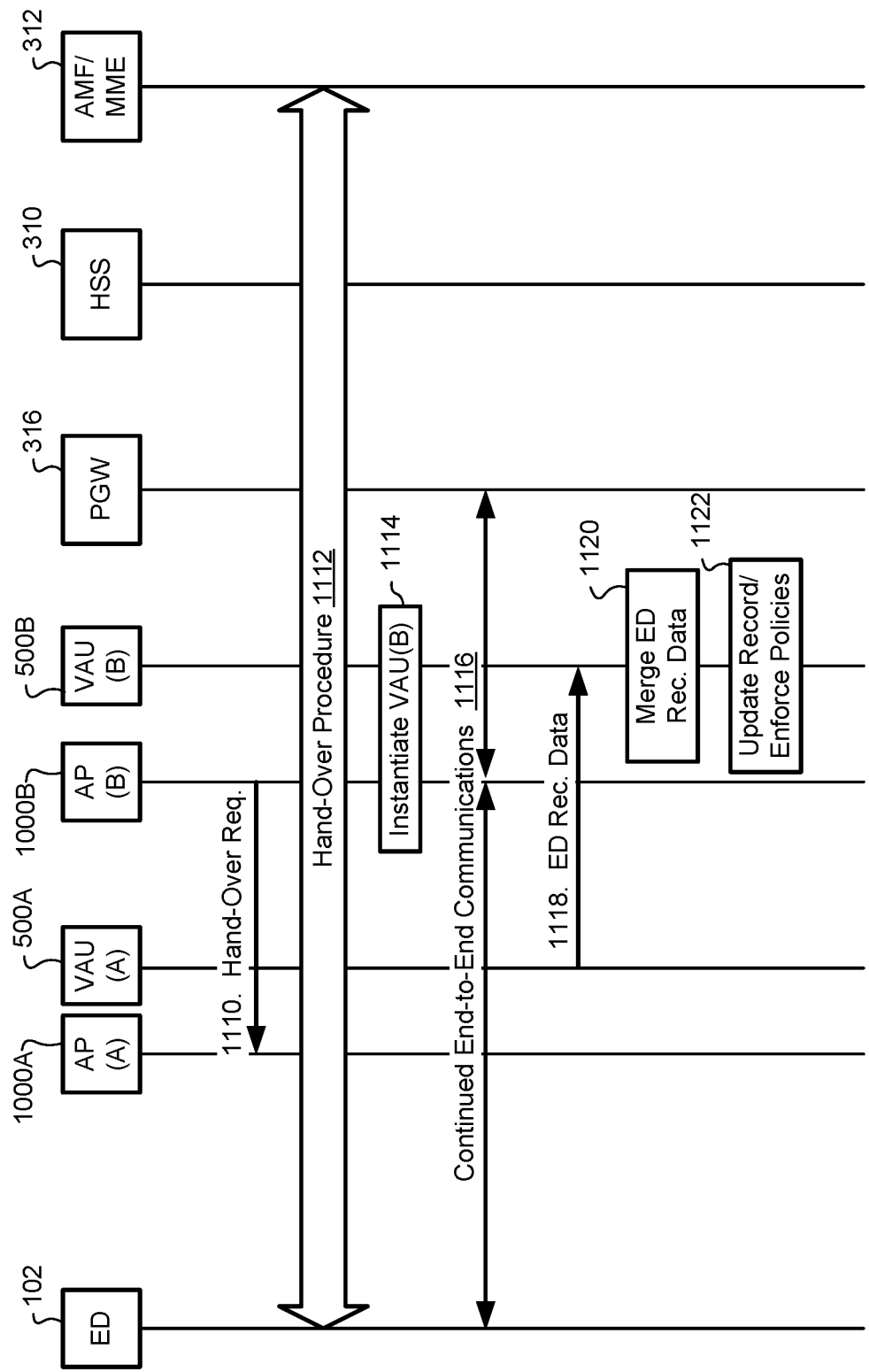

FIG. 11B is a message flow diagram illustrating an example Hand-Over process in accordance with embodiments of the present invention. As may be seen in FIG. 11B, a new VA-enabled access point 1000B may initiate the Hand-Over procedure by sending a Hand-Over request 1110 to the initial VA-enabled access point 1000A. In response to the Hand-Over request 1110, the two access points 1000A and 1000B may interact (at 1112) with each other and network functions (such as, for example, any one or more of the SPS 309, HSS 310, AMF/MME 312 or NEF 314) to establish new connections through the new access point 1000B, and re-route end-to-end traffic flows associated with the ED 102. In addition, the Virtualization Manager 1004B of the new VA-enabled access point 1000B may instantiate (at 1114) a new VAU 500B to store device administration data and implement monitoring and policy enforcement functions pertaining to the ED 102. As noted above, at the time of instantiation, the new VAU 500B may be populated with any suitable combination of default values and information obtained from another location in the network, such as the SPS 309 or PCC 311, for example. Once connections and associations needed to support the ED 102 have been established, end-to-end traffic flows to and from the ED 102 can continue (at 1116).

In order to ensure continuity of traffic monitoring and policy enforcement, the two access points 1000A and 1000B may exchange information identifying the initial and new VAUs 500A, 500B, so that the respective Synchronization Modules 508A and 508B may cooperate to update the VAU 500B instantiated in the new access point 1000B. Thus, in the example of FIG. 11B, the Synchronization Module 508A in the initial VAU 500A may send (at 1118) Device Administration Data pertaining to the ED 102 to the new VAU 500B. In the example of FIG. 11B, the Device Administration Data sent to the new VAU 500B is considered to represent a portion (but not all) of the content of the ED Record 506 maintained by the initial VAU 500A. For example, the Synchronization Module 508A of the initial VAU 500A may only send the contents of the Metrics Portion 512 of its ED Record 506 to the new access point 500B. Upon receipt of the Device Administration Data pertaining to the ED 102 from the initial VAU 500A, the Synchronization Module 508B in the new VAU 500B may merge (at 1120) the received Device Administration Data into its ED Record 506B. Once this merge operation has been completed, the VAU 500B hosted by the new access point 1000B will contain the same information as the VAU 500A hosted by the initial access point 1000A at the time of the Hand-Over. Accordingly, continuity of traffic monitoring and policy enforcement is maintained through the Hand-Over procedure. Thereafter, the Accounting Module 504B of the new VAU 500B may operate in accordance with the Policy information stored in the ED Record 506 to update (at 1122) the ED Record 506 by monitoring the traffic flows to acquire relevant metrics and statistics, and generate reports to enable billing of the customer. At the same time, the Policing Module 502B may operate in accordance with the Policing rules stored in the ED Record 506 to enforce the policies that pertain to the ED 102.

Figure 12:
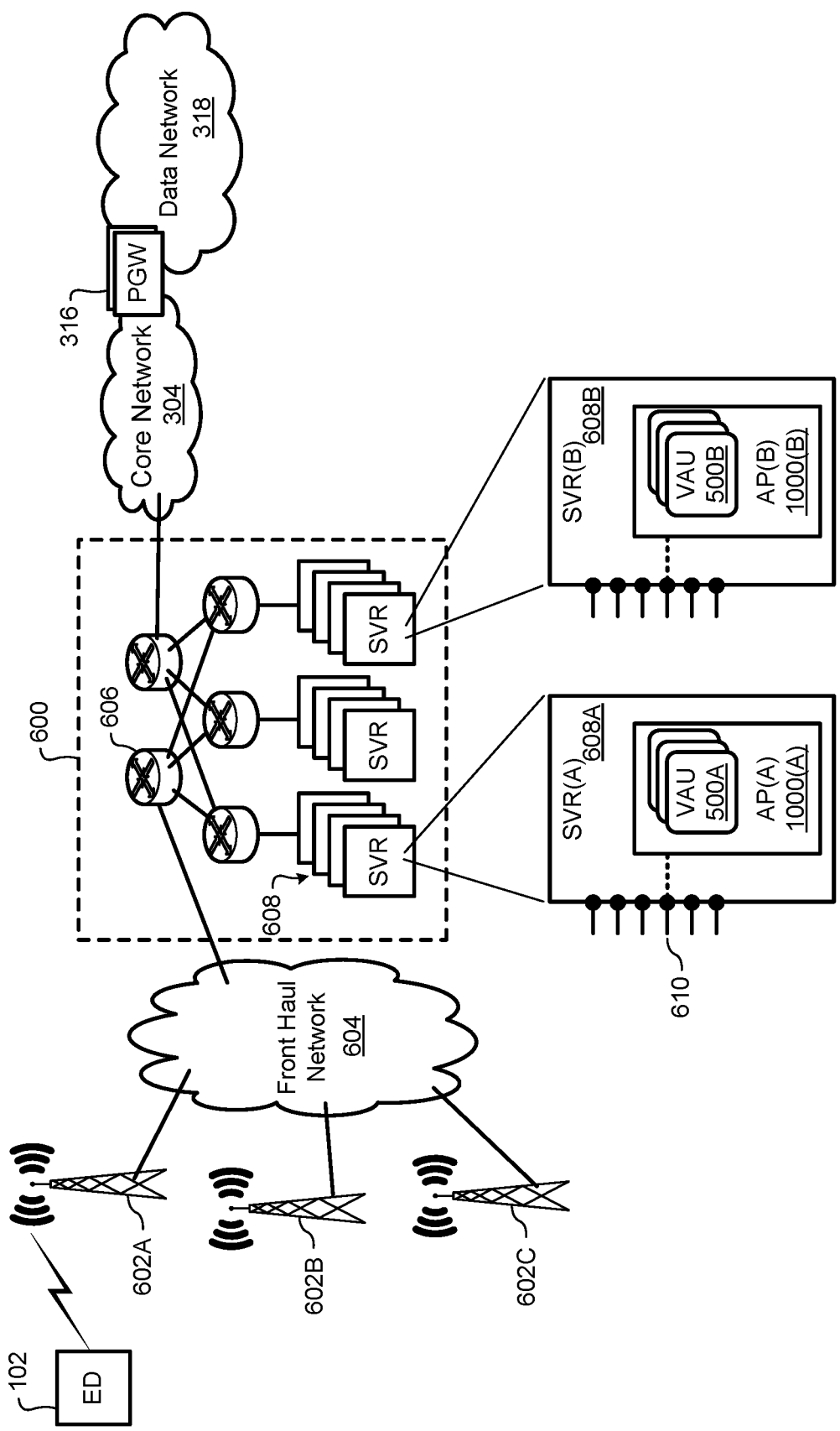
FIG. 12 is a block diagram illustrating elements of a mobile network in which embodiments of the present invention may be deployed in accordance with another representative embodiment of the present invention.

As noted above, a VA-enabled AP 1000 may be implemented as an electronic device or system as described above with reference to FIG. 1, or as a virtualized entity instantiated on a server 200 as described above with reference to FIG. 2. Embodiments in which an AP 1000 is implemented as a virtualized entity are particularly applicable to Centralized Radio Access network (CRAN) environments. FIG. 12 illustrates an example embodiment, in which a data center 600 is connected to core network 304 and a set of radio antennas 602A-C via a Front Haul network 604. The data center 600 may include one or more routers 606 and servers 608. At least some of the servers 608 may host VA-enabled APs 1000. In order to support traffic flows to and from an ED 102, an associated AP 1000 is connected to a designated interface 610 of its host server 608, and traffic to and from the ED 102 routed (by the routers 606, for example) through that interface 610. Traffic monitoring and policy enforcement functions pertaining to the ED 102 may be implemented by a VAU 500 instantiated by the AP 1000 and associated with the interface 610 through which traffic to and from the ED 102 is routed, following the process described above with reference to FIG. 11A. Continuity of traffic monitoring and policy enforcement can be maintained as the ED 102 moves from the coverage area of one antenna 602A to another antenna 602B by a Hand-Over procedure in which the traffic to and from the ED 102 is re-routed to a new AP 1000B (connected to a new interface 610B) and moving at device administration data to a new VAU 500B instantiated by the new AP 1000, following the process described above with reference to FIG. 11B.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method in a node of a mobile network, the method comprising:
   instantiating by an access point of the mobile network, as a single virtual entity configured to operate as part of the existing mobile network, a Virtual Anchor Unit (VAU) configured to:
      maintain device administration data pertaining to a respective mobile electronic device, the device administration data including at least one statistic pertaining to traffic to and from the mobile electronic device, and at least one rule for controlling an operation of the mobile electronic device;
      update the at least one statistic based on the traffic to and from the mobile electronic device; and
      enforce the at least one rule based on the at least one statistic;
   associating the VAU with a monitoring point of traffic to and from the respective mobile electronic device; and
   facilitating operation of the VAU using the monitoring point.

2. The method as claimed in claim 1, wherein the Virtual Anchor Unit (VAU) consists essentially of a single virtualized entity instantiated on a host system.

3. The method as claimed in claim 2, wherein the single virtualized entity comprises either one of a Virtual Machine and a Container.

4. The method as claimed in claim 2, wherein the host system comprises any one or more of: a server; an edge computing platform; and an access point of the mobile network.

5. The method as claimed in claim 1, wherein instantiating the Virtual Anchor Unit (VAU) comprises sending, by an access point associated with the mobile electronic device, a request message to a controller/orchestrator function.

6. The method as claimed in claim 5, wherein the request message comprises any one or more of:
   an identifier of the access point;
   an identifier of the mobile electronic device;
   information identifying a location of the access point associated with the mobile electronic device;
   information regarding one or more interfaces of the access point associated with the mobile electronic device;
   information identifying the monitoring point; and
   information identifying a communication channel of the access point associated with the mobile electronic device.

7. The method as claimed in claim 6, wherein the information identifying the monitoring point comprises any one or more of:
   an identifier of a host interface through which traffic to and from the mobile electronic device is routed;
   an identifier of a sub-interface of the host interface;
   an address of a hypervisor networking entity linking the host interface to the requesting access point; and
   an identifier of an interface of the requesting access point.

8. The method as claimed in claim 1, wherein the monitoring point comprises any one or more of:
   a host interface through which traffic to and from the mobile electronic device is routed;
   a sub-interface of the host interface;
   a hypervisor networking entity linking the host interface to an access point associated with the mobile electronic device; and
   an interface of the access point associated with the mobile electronic device.

9. The method as claimed in claim 1, wherein associating the VAU with a monitoring point of traffic to and from the respective mobile electronic device comprises linking the VAU to the monitoring point such that traffic to and from the respective mobile electronic device traverses the VAU.

10. The method as claimed in claim 1, wherein associating the VAU with a monitoring point of traffic to and from the respective mobile electronic device comprises establishing an association between the VAU and the monitoring point such that at least a traffic monitoring function of the VAU is implemented on the monitoring point.

11. The method as claimed in claim 1, wherein the Virtual Anchor Unit (VAU) is further configured to synchronize the device administration data pertaining to the mobile electronic device with corresponding second device administration data maintained by a second Virtual Anchor Unit (VAU).

12. The method as claimed in claim 1, wherein the node is a server in the Mobile network, and wherein the method further comprises:
   associating the VAU with a second monitoring point of traffic to and from the respective mobile electronic device; and
   facilitating continued operation of the VAU using the second monitoring point.

13. The method as claimed in claim 12, wherein associating the VAU with a monitoring point of traffic to and from the respective mobile electronic device comprises linking the VAU to the monitoring point such that traffic to and from the respective mobile electronic device traverses the VAU.

14. The method as claimed in claim 12, wherein associating the VAU with a monitoring point of traffic to and from the respective mobile electronic device comprises establishing an association between the VAU and the monitoring point such that at least a traffic monitoring function of the VAU is implemented on the monitoring point.

15. The method as claimed in claim 1, wherein the monitoring point is separate from the VAU.

* * * * *